June 28, 1966 J. G. SCHABERG 3,257,853
FLUID DAMPING APPARATUS
Filed July 13, 1962

INVENTOR.
Johannes G. Schaberg
BY
Paul J. Ethington
ATTORNEY

United States Patent Office 3,257,853
Patented June 28, 1966

3,257,853
FLUID DAMPING APPARATUS
Johannes G. Schaberg, New Berlin, Wis., assignor to General Motors Corporation, Detroit, Mich., a corporation of Delaware
Filed July 13, 1962, Ser. No. 209,576
9 Claims. (Cl. 74—5.5)

This invention relates to an apparatus for providing fluid damping of a gyroscope and more particularly to such apparatus in combination with a signal pick-off or torque genreator.

Fluid damped single degree of freedom gyroscopes known in the prior art serve as integrating rate gyroscopes since rotation of the gimbal assembly about the output axis of the gyroscope is restrained by viscous drag exerted by viscous fluid within the spacing between the gimbal assembly and the surrounding gyroscope housing. The fluid also provides a buoyancy effect so as to support the gimbal assembly thereby permitting the use of small bearings and hence minimizing frictional effects. The damping effect provided by the viscous fluid is directly proportional to the surface area of the gimbal assembly, is inversely proportional to the gap distance between the gimbal assembly and the surrounding gyroscope housing and is directly proportional to the viscosity of the fluid itself. One problem encountered in storing fluid damped single degree of freedom gyroscopes at low temperatures is that high viscosity fluids tend to solidify whereby some of the delicate components of the gyroscope may be damaged. Thus, it is necessary if such gyroscopes are to be stored at low temperatures to utilize damping fluids of low viscosity. But, the lower the viscosity of the fluid used the lesser will be the damping effect. The surface area of the gimbal assembly may be increased thereby effectively increasing the damping effect with the same fluid. However, this would be unsatisfactory for applications wherein size and weight of the gyroscopes are of importance. A decrease in gap distance between the gimbal assembly and the surrounding gyroscope housing would also effectively increase the damping effect of the fluid. But, this has the disadvantage in that by decreasing the gap distance the more difficult it becomes to properly fill the spacing between the gimbal assembly and the surrounding gyroscope housing with damping fluid.

One form of the prior art for minimizing the above problem utilizes a low viscosity fluid in the spacing between the gimbal assembly of the surrounding gyroscope. However, the damping effect of the fluid is effectively increased by providing a plurality of longitudinal vanes on the housing extending radially toward the gimbal assembly defining restrictive gaps therebetween and a plurality of longitudinal vanes on the gimbal assembly located between adjacent vanes on the housing and extending radially toward the housing defining restrictive gaps therebetween. A relative rotation of the gimbal assembly with respect to the housing results in the vanes coacting with the fluid whereby the fluid is forced through the restrictive gaps causing differential pressures on opposite sides of the vanes to thereby restrain the rotation of the gimbal assembly. However, a fluid damping apparatus as described requires changes in the configuration of both gimbal assembly and the surrounding gyroscope housing, i.e. the longitudinal vanes, thereby creating costly design problems.

In accordance with the present invention, fluid damping of a single degree of freedom gyroscope is obtained without the necessity of altering the configuration of either the gimbal member or the surrounding gyroscope housing member. This is accomplished by utilizing the magnetic force producing means of a signal generator or a torque generator in association with the gyroscope as a vane damper. A magnetic force producing means including a plurality of salient poles is mounted on one of the members. Each pole of the magnetic force producing means extends radially toward the other member and defines a gap therebetween. The other member has a support member mounted thereon having a plurality of vanes extending radially therefrom between adjacent poles of the magnetic force producing means toward the first member so as to define a gap therebetween. Accordingly, upon relative rotation between the members, the vanes and poles coact together with damping fluid therebetween forcing the fluid to flow through the gaps so as to obtain restraining forces acting on the gimbal member restraining angular displacements thereof with respect to the housing member. In the case of a signal generator utilized in association with a gyroscope, the generator includes the magnetic force producing means and a signal pick-off means mounted on the other member and operative to develop output signals in accordance with relative angular displacements between the members. Similarly, in the case of a torque generator, the generator includes the magnetic force producing means and a torquing coil mounted on the other member and connected with a source of direct voltage so as to obtain direct current flow in the coil in a direction to coact with the magnetic field of the magnetic force producing means to develop a force acting to angularly torque the gimbal member with respect to the housing member.

A more complete understanding of this invention may be had from the detailed description which follows taken with the accompanying drawings in which.

Figure 1:
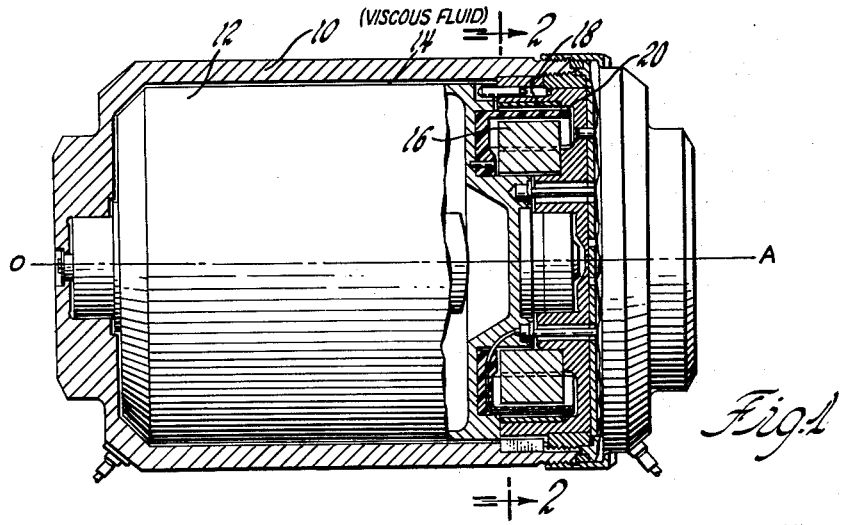
FIGURE 1 is a plan view partially in section showing one embodiment of the invention.
Figure 2:
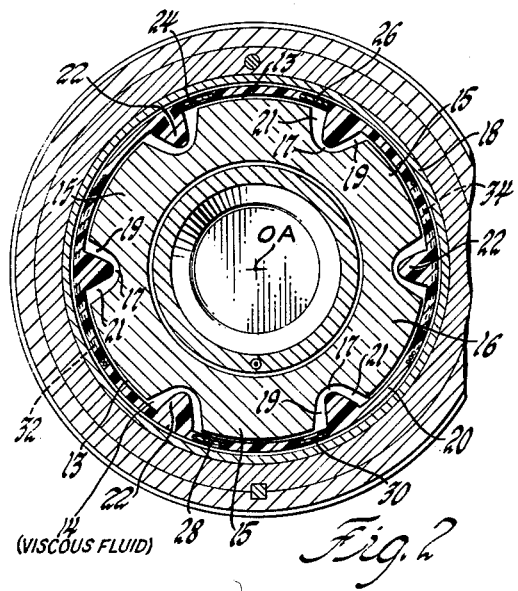
FIGURE 2 is a sectional view of FIGURE 1 taken along line 2—2 looking in the direction of the arrows.
Figure 3:
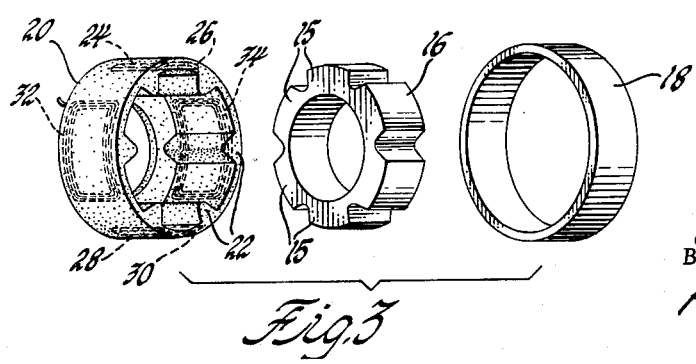
FIGURE 3 is an exploded view showing a permanent magnet stator having a plurality of salient poles, an annular rotor having a plurality of radially extending vanes, and an annular magnetic return path ring.

Referring now to the drawings and in particular to FIGURES 1, 2 and 3, there is shown an illustrative embodiment of the invention. A cylindrically shaped hollow housing 10 which may take the form of a gyroscope housing has suitably supported therein a cylindrically shaped hollow gimbal assembly 12 having an inertial element mounted therein whereby the inertial element has an output axis OA which corresponds with the axis of symmetry of the gimbal assembly 12. A low viscosity fluid 14 is provided which completely fills the spacing between the the gimbal assembly 12 and the housing 10 whereby the fluid 14 provides a degree of buoyancy for the gimbal assembly 12 as well as viscous damping thereby restraining angular displacements of the gimbal assembly 12 about the output axis OA.

A permanent magnet 16 having six salient poles 15 is secured to the inner side of the housing 10 at one end thereof coaxially of the output axis OA to serve as the stator of a signal pickoff and torque generator as later described. A soft iron annular ring 18 is mounted within the housing 10 coaxial with the permanent magnet 16 and disposed outwardly therefrom so as to provide a magnetic return path for the magnetic flux created by the magnet 16. The gimbal assembly 12 has mounted thereon at one end an annular rotor 20 of non-magnetic material, such as epoxy or aluminum, coaxial with the gimbal assembly 12 and located between the stator magnet 16 and the annular ring 18. Each pole 15 of the magnet 16 extends radially toward the rotor 20 defining a narrow restrictive gap 13 therebetween. The rotor 20 has six longitudinal flanges or vanes 22 thereon which extend radially of the rotor 20 toward the stator magnet 16 defining narrow restrictive gaps 17 therebetween. Each vane 22 is located within the space between adjacent poles 15 of the permanent magnet 16 defining pockets 19 and 21 on opposite sides of each vane 22 as shown in FIGURE 2. Signal pick-off means in the form of Hall effect devices 24, 26, 28 and 30 are embedded in the rotor 20 such that the devices 24 and 26 and 28 and 30 are respectively positioned near the pole faces of diametrically opposed poles as shown in FIGURE 2 so as to be traversed by magnetic flux of equal value, including both main flux and fringing effect flux, when the rotor 20 is in its null position. Torquing coils 32 and 34 are embedded in the rotor 20 and are respectively positioned near the pole faces of adjacent poles of the stator 16 as shown in FIGURE 2 whereby each coil is linked by magnetic flux of equal value when the rotor 20 is in its null position.

In accordance with this invention, fluid damping is obtained due to coaction of the poles 15 of the magnet 16 and the vanes 22 with the damping fluid 14 therebetween. For example, if the rotor 20 is angularly displaced counterclockwise in FIGURE 2 about its output axis OA the fluid existing in pockets 21 will be forced to flow through the restrictive gaps 13 to the pockets 19. This follows since the pressure of the fluid 14 in pockets 21 will be greater than that in pockets 19. The velocity of fluid flow through the gaps 13 is a function of the difference in pressure of the fluid 14 in pockets 21 and 19. The differential pressure acting on opposite sides of the vanes 22 results in a restraining torque acting clockwise about the output axis OA so as to restrain counterclockwise angular displacements of the rotor 20. The greater the angular rate of displacement of the rotor 20 about the output axis OA the greater will be the pressure differential on opposite sides of each vane 22. Accordingly, the damping torque created will increase in proportion to the angular rate of displacement of the gimbal assembly 12 with respect to the housing member 10 so as to thereby provide linear viscous damping. For a constant rate of angular displacement of the gimbal assembly 12 with respect to the housing 10, the restraining torque will be inversely proportional to the gap distance of the restrictive gaps 13, and directly proportional to the viscosity of the damping fluid 14 and the surface area of the faces of the poles 15.

In addition to serving as a damping device as described above the permanent magnet 16 is utilized as the magnetic force producing means for a signal generator which is operative to develop output signal voltages proportional to relative angular displacements between the gimbal assembly 12 and the housing member 10. The output or angular displacements of the gimbal assembly 12 with respect to the housing member 10 are proportional to deflections of the gyro wheel caused by input rotational torques applied about the input axes thereof. Thus signal generating means are required to provide output signal voltages in accordance with the angular displacements of the gimbal assembly 12 with respect to the housing member 10 to activate, for example, suitable control devices so as to maintain a controlled member fixed in inertial space.

Figure 4:
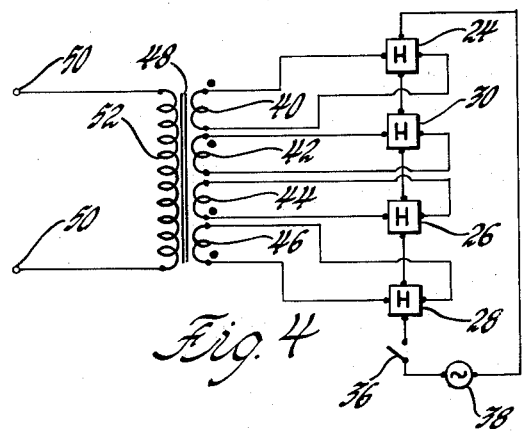
FIGURE 4 is a schematic circuit diagram showing a signal generator which may be used in conjunction with the embodiment of the invention shown in FIGURE 1.

In FIGURE 4 there is shown a schematic circuit diagram of a signal generator which may be used in conjunction with the invention. The Hall effect devices 24, 30, 26 and 28 are connected together in series with a switch 36 across a constant alternating voltage source 38 provided for applying excitation to the devices. Transformer primary windings 40, 42, 44 and 46 on a transformer core 48 are connected across opposite ends of the Hall effect devices 24, 30, 26 and 28, respectively. The primary windings 40 and 42 are oppositely wound on transformer core 48 with respect to the primary windings 44 and 46 as shown by the dots in FIGURE 4 so that magnetomotive forces created by current flowing in the windings cancel out when the output voltages developed by each of the Hall effect devices are equal. Output terminals 50 are connected across the secondary winding 52 on transformer core 48 to provide output signals. Thus, upon angular displacement of the rotor 20 with respect to the magnet 16 an output signal voltage will be developed across the terminals 50 in accordance therewith. For example, if the rotor 20 is displaced counterclockwise about the output axis OA, the magnitude of the magnetic flux traversing the Hall effect devices 26 and 28 will increase and, conversely the magnitude of magnetic flux traversing the Hall effect devices 24 and 30 will decrease. The voltages generated by Hall effect devices 26 and 28 will increase in magnitude whereas the voltages generated by the Hall effect devices 24 and 30 will decrease in magnitude whereby a net magnetomotive force is created on the primary side of the transformer core 48. A voltage will be induced in the secondary windings 52 indicative of the net magnetomotive force on the primary side of the transformer core 48, which voltage is in turn applied across the output terminals 50 so as to provide output signals indicative of the relative angular displacement between the rotor member 20 and the magnet 16.

Figure 5:
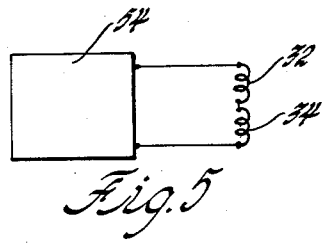
FIGURE 5 is a schematic circuit diagram showing a torque generator which may be used in conjunction with the embodiment of the invention shown in FIGURE 1.

The permanent magnet 16, in addition to serving as a damping device and as the magnetic force producing means of a signal generator, is also utilized to provide the magnetic force producing means in a torque generator. In FIGURE 5, there is shown a schematic circuit diagram of a torque generator which may be used in conjunction with the invention. A source of direct current control signals 54 is connected with the torquing coils 32 and 34 connected together in series. Direct current flow through the coils 32 and 34 coacts with the magnetic field of the permanent magnet 16 to develop forces acting on the rotor 20 and hence on the gimbal assembly 12 to torque the assembly about the output axis OA of the gyroscope. It should be noted that the damping device described hereinbefore will integrate torques developed by the torque generator. However, such a torque generator will be operative to introduce control or reference torques to the gyroscope so as to, for example, orient the gimbal assembly 12 about its output axis OA in accordance with a variable reference in inertial space.

Although the description of the invention has been given with respect to a particular embodiment, it is not to be construed in a limiting sense. Numerous variations and modifications within the spirit and scope of the invention will now occur to those skilled in the art. For a definition of the invention, reference is made to the appended claims.

I claim:
1. A fluid damping apparatus for an inertial instrument comprising a cylindrically shaped gimbal member rotatably supported within a cylindrically shaped hollow housing member defining a space therebetween, damping fluid filling the space so as to obtain damping restraint of relative angular displacements between the members, and a signal generator including magnetic force producing means and signal pick-off means, the magnetic force producing means including a plurality of salient poles mounted on one of the members, each pole extending radially toward the other member defining a gap therebetween, the other member having mounted thereon a support member, the support member having a plurality of vanes extending radially therefrom toward the first member between adjacent poles of the magnetic force producing means defining a gap therebetween whereby upon relative rotation between the members the vanes and poles coact together with the fluid forcing the fluid to flow through the gaps so as to obtain restraining forces acting on the gimbal member restraining angular displacements thereof with respect to the housing member, the signal pick-off means being mounted on the support member and operative to develop output signals in accordance with relative angular displacements between the members.

2. A fluid damping apparatus for an inertial instrument comprising a cylindrically shaped gimbal member rotatably supported within a cylindrically shaped hollow housing member defining a space therebetween, damping fluid filling the space so as to obtain damping restraint of relative angular displacements between the members, a torque generator including unidirectional magnetic force producing means and a torquing coil, the magnetic force producing means including a plurality of salient poles mounted on one of the members, each pole extending radially toward the other member defining a gap therebetween, the other member having mounted thereon a support member, the support member having a plurality of vanes extending radially therefrom toward the first member between adjacent poles of the magnetic force producing means defining a gap therebetween whereby upon relative rotation between the members the vanes and poles coact together with the fluid forcing the fluid to flow through the gaps so as to obtain restraining forces acting on the gimbal member restraining angular displacements of the gimbal member with respect to the housing member, the torquing coil being mounted on the support member and connected with a source of direct voltage so as to obtain direct current flow in the coil in a direction to coact with the magnetic field of the magnetic force producing means to develop a force acting to angularly torque the gimbal member with respect to the housing member.

3. A fluid damping apparatus for an inertial device comprising a cylindrically shaped hollow housing, a cylindrically shaped gimbal assembly, means for rotatably supporting the gimbal assembly within the housing, a space defined between the assembly and the housing, damping fluid filling the space for restraining angular displacements of the gimbal assembly with respect to the housing, an annular rotor member mounted to the gimbal assembly for rotation therewith, a signal generator including magnetic force producing means and signal pick-off means, the magnetic force producing means including a plurality of salient poles mounted to the housing, each pole extending radially toward the rotor member defining a gap therebetween, and a plurality of vanes provided on the rotor member, each vane extending radially toward the force producing means between adjacent poles thereof defining a gap therebetween, whereby upon relative rotation between the gimbal assembly and the housing the vanes and poles coact together with the fluid forcing the fluid through the gaps so as to obtain restraining forces acting on the gimbal assembly restraining angular displacements of the gimbal assembly with respect to the housing, the signal pick-off being mounted on the rotor member and operative to develop output signals in accordance with relative angular displacements between the gimbal assembly and the housing.

4. A fluid damping apparatus for an inertial device comprising a cylindrically shaped hollow housing, a cylindrically shaped gimbal assembly, means for rotatably supporting the gimbal assembly within the housing, a space defined between the assembly and the housing, damping fluid filling the space for restraining angular displacements of the gimbal assembly with respect to the housing, an annular rotor member mounted to the gimbal assembly for rotation therewith, a torque generator including unidirectional magnetic force producing means and a torquing coil, the magnetic force producing means including a plurality of salient poles mounted to the housing, each pole extending radially toward the rotor member defining a gap therebetween, and a plurality of vanes provided on the rotor member, each vane extending radially toward the force producing means between adjacent poles thereof defining a gap therebetween, and a plurality of vanes provided on the rotor member, each vane extending radially toward the force producing means between adjacent poles thereof defining a gap therebetween whereby upon relative rotation between the gimbal assembly and the housing the vanes and poles coact together with the fluid forcing the fluid through the gaps so as to obtain restraining forces acting on the gimbal assembly restraining angular displacements of the gimbal assembly with respect to the housing, the torquing coil being mounted on the rotor member and connected with a source of direct voltage so as to obtain direct current flow in the coil in a direction to coact with the magnetic field of the magnetic force producing means to develop a force acting to angularly torque the gimbal assembly with respect to the housing.

5. A fluid damping apparatus for an inertial device comprising a cylindrically shaped hollow housing, a cylindrically shaped gimbal assembly, means for rotatably supporting the gimbal assembly within the housing, a space defined between the assembly and the housing, damping fluid filling the space for restraining angular displacements of the gimbal assembly with respect to the housing, an annular rotor member coaxially mounted on one end of the gimbal assembly for rotation therewith, a signal generator including a permanent magnet and signal pickoff means, the permanent magnet having a plurality of salient poles mounted to the inner side of the housing at one end thereof, each pole extending radially toward the rotor member defining a restrictive gap therebetween, and a plurality of longitudinal vanes provided on the rotor member, each vane extending radially toward the permanent magnet between adjacent poles thereof defining a restrictive gap therebetween whereby upon relative rotation between the gimbal assembly and the housing the vanes and poles coact together with the fluid forcing the fluid through the restrictive gaps so as to obtain restraining forces acting on the gimbal assembly restraining angular displacements of the gimbal assembly with respect to the housing, the signal pickoff means being mounted on the rotor member and operative to develop output signals in accordance with relative angular displacements between the gimbal assembly and the housing.

6. A fluid damping apparatus for an inertial device comprising a cylindrically shaped hollow housing, a cylindrically shaped gimbal assembly, means for rotatably supporting the gimbal assembly within the housing, a space defined between the assembly and the housing, damping fluid completely filling the space for restraining angular displacements of the gimbal assembly with respect to the housing, an annular rotor member coaxially mounted on one end of the gimbal assembly for rotation therewith, a torque generator comprising a permanent magnet and a torquing coil, the permanent magnet having a plurality of salient poles mounted to the inner side of the housing at one end thereof, each pole extending radially toward the rotor member defining a restrictive gap therebetween, and a plurality of longitudinal vanes provided on the rotor member, each vane extending radially toward the permanent magnet between adjacent poles thereof defining a restrictive gap therebetween whereby upon relative rotation between the gimbal assembly and the housing the vanes and poles coact together with the fluid forcing the fluid through the restrictive gaps so as to obtain restraining forces acting on the gimbal assembly restraining angular displacements of the gimbal assembly with respect to the housing, the torquing coil being mounted on the rotor member and connected with a source of direct voltage so as to obtain direct current flow in the coil in a direction to coact with the magnetic field of the magnet to develop a force acting to angularly torque the gimbal assembly with respect to the housing.

7. A fluid damping apparatus for an inertial device comprising a cylindrically shaped hollow housing, a cylindrically shaped gimbal assembly, means for rotatably supporting the gimbal assembly within the housing, a space defined between the assembly and the housing, low viscosity damping fluid filling the space for restraining angular displacements of the gimbal assembly with respect to the housing, an annular rotor member coaxially mounted on one end of the gimbal assembly for rotation therewith, a permanent magnet having a plurality of salient poles mounted to the inner side of the housing at one end thereof, each pole extending radially toward the rotor member defining a restrictive gap therebetween, a plurality of longitudinal vanes provided on the rotor member, each vane extending radially toward the permanent magnet between adjacent poles thereof defining a restrictive gap therebetween whereby upon relative rotation between the gimbal assembly and the housing the vanes and poles coact together with the fluid forcing the fluid through the restrictive gaps so as to obtain restraining forces acting on the gimbal assembly restraining angular displacements of the gimbal assembly with respect to the housing, a signal generator including the permanent magnet and signal pick-off means, the signal pick-off means being mounted on the rotor member and operative to develop output signals in accordance with angular displacements of the gimbal assembly with respect to the housing, and a torque generator including the permanent magnet and a torquing coil, the torquing coil being mounted on the rotor member and connected with a source of direct voltage so as to obtain direct current flow in the coil in a direction to coact with the magnetic field of the magnet to develop a force acting to angularly torque the gimbal assembly with respect to the housing.

8. In combination with gyro apparatus including a cylindrical gimbal supported within and spaced from a hollow housing for rotation about an axis and damping fluid filling the space between the gimbal and housing to restrain relative angular displacement; displacement signal generator means comprising an annular permanent magnet having a plurality of radially extending poles and being disposed on the housing so as to be symmetrical about said axis, annular support means disposed on the gimbal coaxially with the permanent magnet and having formed thereon a plurality of radially extending vanes disposed between the poles of the magnet and defining a continuous gap therebetween which is filled with the damping fluid, and pickoff means carried by the support means and disposed within the field produced by the magnet for producing a signal related to a change in the magnetic field occasioned by a relative angular displacement between the gimbal and housing.

9. The combination as defined in claim 8 further including a plurality of torquing coils carried by the support means and disposed adjacent respective poles of the magnet, and means for energizing the coils.

References Cited by the Examiner
UNITED STATES PATENTS 2,929,250    3/1960    Passarelli et al. _____ 74—5.6
2,960,876   11/1960    Saphra _____ 74—5.7

MILTON KAUFMAN, *Primary Examiner.*

BROUGHTON G. DURHAM, *Examiner.*

T. W. SHEAR, *Assistant Examiner.*